Patented Mar. 18, 1941

2,235,661

UNITED STATES PATENT OFFICE 2,235,661

HYDROHALIDES OF PSEUDOTROPINE BENZILIC ACID ESTER

Otto Wolfes and Otto Hromatka, Darmstadt, Germany, assignors to Merck & Co. Inc., Rahway, N. J., a corporation of New Jersey No Drawing. Application August 17, 1938, Serial No. 225,348. In Germany June 1, 1935

4 Claims. (Cl. 260—292)

This is a continuation-in-part of application Serial No. 81,026, filed May 21, 1936.

This invention relates to certain new esters of pseudotropine, and to processes for their production; and more especially, it is concerned with the benzilic acid ester thereof.

While the esters of tropine, e. g. atropine and hometropine, have found medicinal application for decades, the respective esters of pseudotropine have only received slight attention and have not been introduced as pharmaceutical preparations.

We have now found that the therapeutic effects of the benzilic acid ester of pseudotropine greatly exceed the therapeutic effectiveness of the esters of tropine itself, such as atropine and hometropine, both of which have found wide use in the medicinal field. In particular, we have found that the spasmolytic action which the new compound exhibits on the intestine is much greater than that exerted by atropine. On the other hand, its mydriatic action, which in itself is undesirable in a spasmolytic, is only about equal to that of atropine, and this action is, therefore, relatively unimportant when the compound is used in quantities sufficient to produce spasmolytic action. The therapeutic latitude (therapeutically active limit in relation to fatal dose) is considerably greater with this new compound than with atropine and the other known esters now in use. Furthermore, our new product has also shown interesting possibilities for employment as a local anesthetic.

According to our invention, the benzilic acid ester of pseudotropine may be obtained by reacting directly upon pseudotropine with benzilic acid. For example, the two compounds may be combined either with or without a solvent, in the presence of strong acids, or the esterification may be carried out by means of re-esterification by reacting esters of benzilic acid upon pseudotropine.

It is also possible, and in many cases advantageous, to replace the hydroxyl group of the benzilic acid, before esterification, by a group which can later be resubstituted to the hydroxyl. Aside from the possibility of proceeding with acyl derivatives, a particularly suitable method of working in this manner comprises the process of esterifying pseudotropine with diphenyl-halogenoacetic acid halide and, thereafter, reconverting the halide in the ester obtained into the hydroxyl group by means of hydrolyzing agents. Alkaline, even weakly alkaline, agents are especially suitable for use as hydrolyzing agents for this reaction, but the substitution of the halogen by the hydroxyl group may also be carried out successfully in acidic, as well as neutral aqueous solution.

It is unusual that this reaction will follow smoothly because it is understood to be generally impracticable to substitute hydroxyl for the halogen of halo-phenyl-acetyl-tropeine by treatment with alkali. (See Jowett & Pyman, Journal of Chem. Soc., London, vol. 95, 1909, p. 1020 et seq.) Furthermore, the findings of Wolffenstein and Mamlack, (Ber. Der Deuts. Chem. Gell. vol. 41, 1908, p. 723) that the tropeine halogen of the halo-hydrotropic acid can not be converted to hydroxyl, but is split off as hydrochloric acid, show the unexpectedness of the smooth reaction obtained by our process.

The thus far unknown pseudotropine benzilic acid ester above described has the formula $C_{22}H_{25}O_3N$, and forms colorless crystals having a melting point of about 156–158° C. It may be converted to a hydrohalide, for example, hydrochloride, hydrobromide, etc. The hydrochloride is readily soluble in water, and melts at about 232° C.

The specific examples given are given for the purpose of illustrating preferred methods of carrying out the invention. According to some of the examples, the pseudotropine benzilic acid ester may be prepared and then converted to its hydrohalide by reaction with the corresponding acid, which may, of course, be varied according to the salt which it is desired to prepare. Also, the hydrohalide may be prepared directly by reacting pseudotropine hydrohalide with diphenyl halide of acetic acid. Obviously the steps described may be modified considerably as to the actual reactants employed, etc., without departing from the spirit of the invention substantially as described and claimed, and it is understood that we are not to be limited to the specific embodiments shown.

Examples

1. About 14 parts of pseudotropine, 30 parts of benzilic acid and 4 parts of water are heated to about 150° C. for 10 hours, while conducting a weak stream of hydrochloric acid through the apparatus. The melted substance is digested with water and repeatedly extracted with ether to remove non-basic, ether-soluble ingredients. The acidic aqueous solution is then ammoniated and the liberated pseudotropine benzilic acid ester (about 6 parts) is isolated, purified by recrystallization, and converted to its hydrohalide.

2. About 14 parts of pseudotropine, 29 parts of benzilic acid methyl ester, and 4 parts of methanol are heated to about 140-150° C. for 10 hours while conducting a weak stream of hydrochloric acid through the apparatus. The process is then finished according to the further steps given in Example 1.

3. About 28 parts of pseudotropine base are dissolved in 140 parts of benzole of about 60° C., and mixed with a solution of 29 parts of diphenylchloro-acetic acid chloride in 58 parts of benzole and heated for a considerable period of time at 60° C. Water and diluted hydrochloric acid are then added, until the reaction is acid to Congo, whereupon the aqueous solution is separated from the benzole.

The aqueous solution is ammoniated under cooling, whereby the pseudotropine-benzilic acid ester is precipitated first as an amorphous and then as a crystalline compound. The yield is about 30 parts. From the combined mother liquors of pseudotropine-benzilic acid ester, about 14 parts of pseudotropine can be recovered. The benzilic acid ester of pseudotropine thus obtained may be converted to its hydrohalide as in Example 1.

4. About 17.8 parts of pseudotropine hydrochloride are heated for several hours to about 140° C. with 26.6 parts of diphenylchloro-acetic acid chloride. The melted substance is then dissolved in water, extracted with ether to remove non-basic, ether-soluble ingredients, and ammoniated, whereupon the benzilic acid ester of pseudotropine is obtained. The yield is about 30 parts. This is treated further in accordance with Example 1.

5. About 14 parts of pseudotropine are heated with 30 parts of benzilic acid to 130-140° C. for about five hours while conducting a weak stream of hydrochloric acid through the apparatus. Thereafter, the melted substance is digested with water and ether and the aqueous solution repeatedly extracted with ether to remove the non-basic, ether-soluble ingredients. By further finishing the process in accordance with Example 1, 3.5 parts of pseudotropine benzilic acid ester are obtained. The ester may be converted to its hydrohalide.

6. About 14 parts of pseudotropine are mixed with 28 parts of benzilic acid methyl ester, and the mixture heated for about two hours to 120-130° C. The melted substance is taken up in dilute hydrochloric acid and ether. By finishing the process by the steps given in Example 1, pseudotropine benzilic acid ester is obtained. The ester may be converted to its hydrochloride.

7. About 14 parts of pseudotropine are heated with about 27 parts of acetyl-benzilic acid to 140° C., while conducting a weak stream of hydrochloric acid through the apparatus. Pseudotropine benzilic acid ester is obtained by the further steps of Example 1. It may be converted to its hydrohalide.

8. About 14 parts of pseudotropine are heated with about 28 parts of acetyl-benzilic acid methyl ester for two hours to 120-130° C. With the acetyl-substituted methyl ester of benzilic acid the re-esterification and separation of the acetyl group could also be performed. For, when the process is finished by the further steps of Example 6, 4.5 parts of pseudotropine-benzilic acid ester are obtained. It may be converted to its hydrohalide.

9. About 10 gms. of pseudotropine hydrochloride are heated with about 18 gms. of diphenylchlor-acetic acid chloride for three hours to 130-140° C. The melted substance is then poured into a suspension of 40 gms. of precipitated calcium carbonate in 200 cc. of water, under constant stirring. The mixture is slightly warmed for ten minutes. The litmus-neutral solution is separated from the precipitate by filtration and evaporated in vacuo. The residue and distillate give neutral reaction with litmus.

The dry residue is boiled repeatedly with chloroform in which the calcium carbonate and calcium chloride remains undissolved, and only the hydrochloride of the formed base is dissolved. The chloroform solution is concentrated and the crystallized residue is redissolved in alcohol. Pseudotropine benzilic acid ester hydrochloride is obtained, having a melting point of about 232° C. (corr.).

We claim as our invention:

1. Hydrohalides of benzilic acid ester of pseudotropine.
2. The hydrochloride of benzilic acid ester of pseudotropine.
3. The hydrobromide of benzilic acid ester of pseudotropine.
4. The hydro-iodide of benzilic acid ester of pseudotropine.

OTTO WOLFES.
OTTO HROMATKA.